United States Patent
Wolfe, Jr. et al.

(10) Patent No.: US 10,244,735 B2
(45) Date of Patent: Apr. 2, 2019

(54) PET TREAT DELIVERY SYSTEMS

(71) Applicants: Jerry J. Wolfe, Jr., Hutto, TX (US); Harold Keith Benson, Hutto, TX (US)

(72) Inventors: Jerry J. Wolfe, Jr., Hutto, TX (US); Harold Keith Benson, Hutto, TX (US)

(73) Assignee: Starmark Pet Products, Inc, Hutto, TX (US)

( * ) Notice: Subject to any disclaimer, the term of this patent is extended or adjusted under 35 U.S.C. 154(b) by 678 days.

(21) Appl. No.: 14/635,060

(22) Filed: Mar. 2, 2015

(65) Prior Publication Data
US 2016/0255812 A1 Sep. 8, 2016

(51) Int. Cl.
*A01K 15/00* (2006.01)
*A01K 15/02* (2006.01)
*A01K 5/00* (2006.01)
*B29L 23/00* (2006.01)

(52) U.S. Cl.
CPC .............. *A01K 15/026* (2013.01); *A01K 5/00* (2013.01); *A01K 15/025* (2013.01); *B29L 2023/003* (2013.01)

(58) Field of Classification Search
CPC ..... A01K 15/00; A01K 15/025; A01K 15/026
See application file for complete search history.

(56) References Cited

U.S. PATENT DOCUMENTS

| | | | |
|---|---|---|---|
| 4,413,014 A | 11/1983 | Melancon | |
| D333,937 S | * 3/1993 | Prosser | D30/160 |
| D344,161 S | * 2/1994 | Markham | D30/160 |
| 5,595,142 A | * 1/1997 | Chill | A01K 5/0114 119/710 |
| 5,695,797 A | 12/1997 | Geromini et al. | |
| 5,865,146 A | * 2/1999 | Markham | A01K 15/026 119/707 |
| 6,148,771 A | * 11/2000 | Costello | A01K 15/026 119/709 |
| 6,223,693 B1 | 5/2001 | Perlberg et al. | |
| 6,238,715 B1 | 5/2001 | Baikie | |
| 6,277,420 B1 | * 8/2001 | Andersen | A23K 50/40 426/138 |
| 6,470,830 B2 | * 10/2002 | Mann | A01K 15/026 119/709 |
| 6,517,877 B2 | 2/2003 | Gannon | |

(Continued)

FOREIGN PATENT DOCUMENTS

EP 1061795 12/2000
WO 9945763 9/1999

OTHER PUBLICATIONS

Starmark Pet Products, Inc., Application No. 16158028.7, Extended European Search Report dated Oct. 2, 2017.

*Primary Examiner* — Monica L Williams
*Assistant Examiner* — Aaron M Rodziwicz
(74) *Attorney, Agent, or Firm* — Russell Ng PLLC; Brian F. Russell

(57) ABSTRACT

An animal treat delivery system includes an elongated body formed of an animal digestible material and having an interior surface and an exterior surface. The interior surface defines a cavity and includes a plurality of projections extending from the interior surface into the cavity. One or more of the plurality of animal digestible treats are retained within the cavity of the elongated body by the projections.

11 Claims, 3 Drawing Sheets

(56) References Cited

U.S. PATENT DOCUMENTS

| | | | |
|---|---|---|---|
| 6,546,896 B1* | 4/2003 | Markham | A01K 15/026 119/709 |
| 6,584,938 B2 | 7/2003 | Sherrill et al. | |
| 6,886,496 B1 | 5/2005 | Brown | |
| 6,981,471 B1 | 1/2006 | Dubinins et al. | |
| 7,025,020 B2 | 4/2006 | Brown | |
| 7,032,541 B1* | 4/2006 | Tsengas | A01K 15/026 119/709 |
| 7,082,894 B2 | 8/2006 | Sherrill et al. | |
| D544,655 S | 6/2007 | Hass | |
| 7,506,614 B1* | 3/2009 | Tsengas | A01K 15/026 119/709 |
| 7,677,203 B2* | 3/2010 | Stern | A23N 17/005 119/709 |
| 7,879,377 B2 | 2/2011 | Dahl et al. | |
| 7,909,003 B2 | 3/2011 | Willinger | |
| 7,976,884 B2 | 7/2011 | Weinberg | |
| 7,997,229 B2 | 8/2011 | Saborio et al. | |
| 8,074,609 B2 | 12/2011 | Adkins | |
| 8,127,720 B2 | 3/2012 | Willinger | |
| 8,161,914 B2 | 4/2012 | Adkins et al. | |
| 8,192,776 B2 | 6/2012 | Vardy et al. | |
| D664,723 S | 7/2012 | Wolfe, Jr. et al. | |
| 8,349,381 B2 | 1/2013 | Weinberg | |
| 8,360,008 B2 | 1/2013 | Willinger et al. | |
| 8,776,728 B2 | 7/2014 | Xu | |
| 2002/0185085 A1 | 12/2002 | Sherrill et al. | |
| 2005/0045115 A1* | 3/2005 | Mann | A01K 15/026 119/711 |
| 2006/0081195 A1 | 4/2006 | Jiang | |
| 2006/0243218 A1* | 11/2006 | Woltmann | A01K 15/026 119/710 |
| 2007/0289553 A1* | 12/2007 | Jager | A01K 15/026 119/710 |
| 2008/0141948 A1* | 6/2008 | Renforth | A01K 15/026 119/710 |
| 2008/0251033 A1 | 10/2008 | Dennis | |
| 2008/0314333 A1* | 12/2008 | Hurwitz | A01K 15/026 119/709 |
| 2009/0151649 A1* | 6/2009 | Vardy | A01K 15/026 119/710 |
| 2009/0314222 A1* | 12/2009 | Chefetz | A01K 15/026 119/707 |
| 2010/0255155 A1* | 10/2010 | Stone | A23L 13/03 426/92 |
| 2011/0253062 A1* | 10/2011 | Adkins | A01K 15/026 119/710 |
| 2011/0265732 A1* | 11/2011 | Lai | A01K 15/026 119/710 |
| 2011/0277698 A1* | 11/2011 | Chefetz | A01K 15/026 119/709 |
| 2012/0085296 A1 | 4/2012 | Stern | |
| 2012/0090554 A1* | 4/2012 | Nunn | A01K 15/025 119/707 |
| 2012/0111284 A1* | 5/2012 | Berger | A01K 15/026 119/709 |
| 2013/0029011 A1 | 1/2013 | Carrillo et al. | |
| 2013/0061815 A1* | 3/2013 | Mobrem | A01K 15/025 119/707 |
| 2013/0074780 A1* | 3/2013 | Wechsler | A01K 15/025 119/710 |
| 2013/0152871 A1 | 6/2013 | Dewey et al. | |
| 2013/0247836 A1 | 9/2013 | Axelrod et al. | |
| 2014/0044838 A1 | 2/2014 | Xu | |
| 2014/0123908 A1* | 5/2014 | Crotty | A01K 15/025 119/707 |
| 2014/0130750 A1* | 5/2014 | Valle | A01K 15/025 119/708 |
| 2014/0209038 A1 | 7/2014 | Simon | |
| 2014/0224184 A1 | 8/2014 | Dewey et al. | |
| 2014/0261195 A1* | 9/2014 | Reiss | A01K 5/0114 119/51.01 |
| 2014/0295052 A1 | 10/2014 | Elliott et al. | |
| 2014/0345532 A1* | 11/2014 | Valle | A01K 5/0114 119/51.01 |
| 2016/0212975 A1* | 7/2016 | Wolfe, Jr. | A01K 15/025 |
| 2016/0255814 A1* | 9/2016 | Kyle | A01K 15/026 |
| 2016/0316719 A1* | 11/2016 | Parness | A01K 15/025 |
| 2017/0020109 A1* | 1/2017 | Dewey | A01K 15/026 |

* cited by examiner

PET TREAT DELIVERY SYSTEMS

BACKGROUND OF THE INVENTION

The present invention relates to articles of manufacture and associated methods, and more specifically, to articles such as pet treats and pet toys that function as pet treat delivery systems and associated methods of manufacture and use.

It is well known in the art that boredom is a significant contributor to destructive behavior in domesticated animals. For example, U.S. Pat. No. 6,634,318 to Rucker and the prior art referenced therein discloses that barking, digging and other destructive behaviors are common problem behaviors of canines that become discontented or bored. As further disclosed in these patents, one common approach utilized in the art to address such destructive behaviors in dogs is to provide a toy with which the dog can interact and that encourages such interaction by rewarding the dog. For example, one class of dog toys dispense food (e.g., treats) from a hollow interior cavity through an opening as a dog interacts with the toy. The Rucker dog toy utilized an edible closure, a portion of which extended outside of the dog toy, to initially prevent treats from escaping through an opening in the toy. As a dog broke the edible closure, the edible closure dislodged from the opening to allow treats to readily exit the Rucker dog toy.

BRIEF SUMMARY

The present disclosure appreciates that pet toys that function as pet treat delivery systems may reduce destructive behavior of a pet only during a time period in which the pet remains interested in the pet toy. The present disclosure also appreciates that a pet may quickly loose interest in a pet toy when the pet toy no longer includes pet treats.

In at least one embodiment, an animal treat delivery system includes an elongated body having an interior surface and an exterior surface. In various embodiments, the interior surface defines a cavity and includes a plurality of projections extending from the interior surface into the cavity. In one or more embodiments, one or more of a plurality of animal digestible treats are retained within the cavity of the elongated body by the projections. In at least one embodiment, the elongated body is extruded from an animal digestible material.

In various embodiments, the plurality of projections are spaced to permit a first animal digestible treat to be slidably received in the cavity of the elongated body when inserted in a first orientation and second animal digestible treats of the same dimensions as the first animal digestible treat to block ends of the cavity of the elongated body by interference fit with the projections when inserted in a second orientation.

In another embodiment, the animal treat delivery system includes an elastomeric body having an interior cavity and at least one opening communicating between the interior cavity and an exterior of the elastomeric body. In this embodiment, the elongated body is disposed in the interior cavity of the elastomeric body. In one or more embodiments, the at least one opening is a single opening in one end of the elastomeric body. In other embodiments, the at least one opening corresponds to two openings. A first one of the two openings is formed in a first end of the elastomeric body and a second one of the two openings is formed in a second end of the elastomeric body that is opposite the first end of the elastomeric body.

In at least one embodiment, the elastomeric body includes a series of ridges extending from the exterior. In one or more embodiments, a first group of the series of ridges is adjacent a first end of the elastomeric body and a second group of the series of ridges is adjacent a second end of the elastomeric body.

DETAILED DESCRIPTION

Disclosed herein are innovative articles, such as pet treats and pet toys that function as pet treat delivery systems, as well as associated methods of manufacture and use. In one embodiment described in detail herein, animal digestible pet treats are loaded into and retained within an extruded animal digestible treat rod. The relative sizing and construction of an interior of the treat rod permits a train of animal digestible treats to be retained within the treat rod by "side-loading" a animal digestible treat, for example, at opposite ends of the treat rod and optionally between the ends of the treat rod. The general construction of the treat rod and animal digestible treats serves to increase a time in which animal digestible material is retained within an interior of an associated pet toy and, as such, increases the time in which a pet may remain interested in the pet toy. In another embodiment, the treat rod is made of an elastomer to further increase the time it takes for a pet to remove the animal digestible treats from the treat rod.

Figure 1:
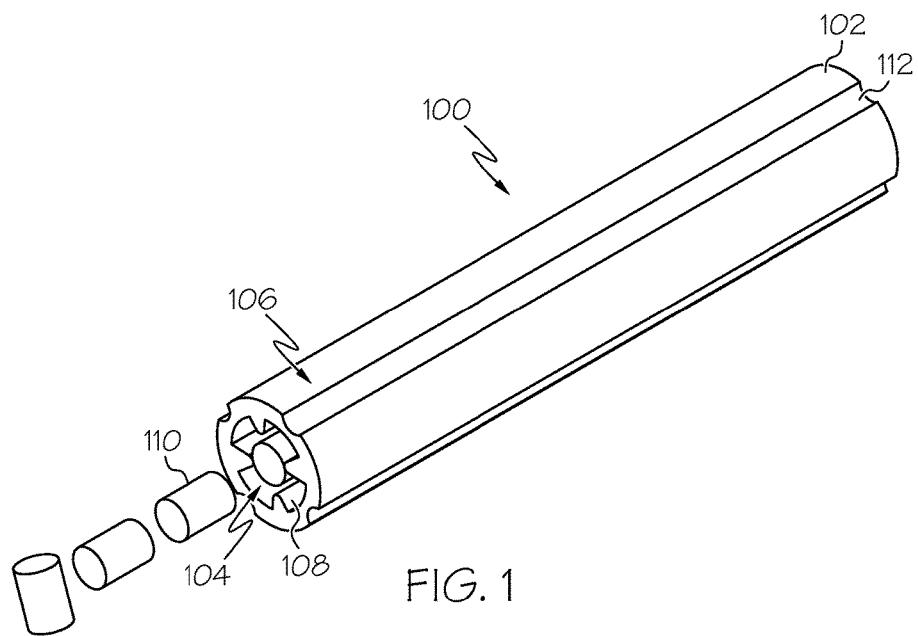
FIG. 1 is a perspective view of an elongated body of an animal treat delivery system ("treat rod") that is configured to retain animal digestible treats in accordance with one embodiment.
Figure 2:
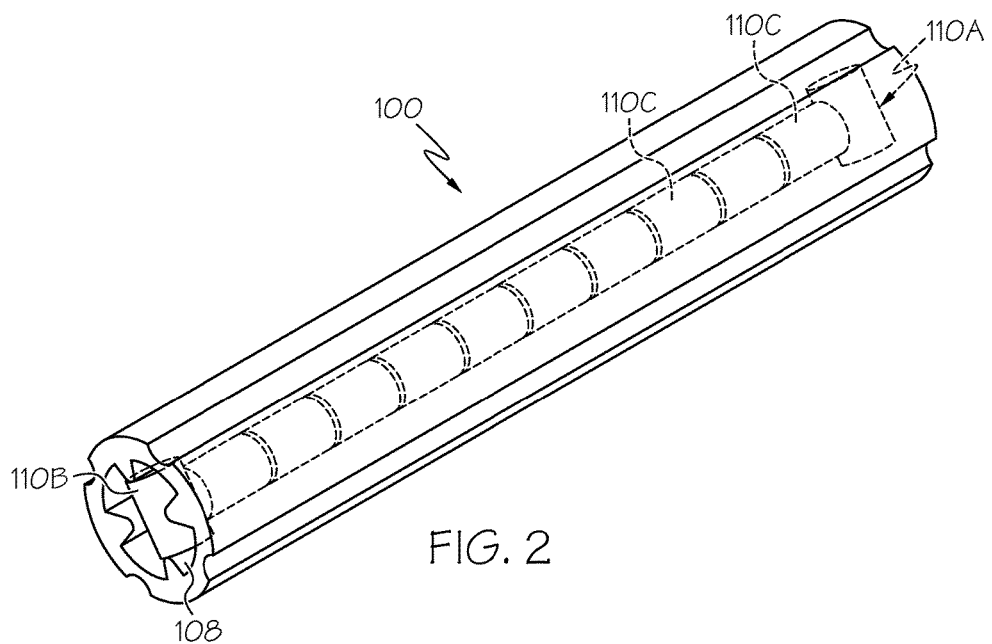
FIG. 2 is a view of the treat rod of FIG. 1 further illustrating the insertion of the animal digestible treats within a cavity of the treat rod.

With reference to FIGS. 1 and 2, an animal treat delivery system 100 is illustrated that is configured according to an embodiment of the present disclosure. With reference to FIG. 1, animal treat delivery system 100 includes an elongated body ("treat rod") 102. In one or more preferred embodiments, treat rod 102 is a frangible, rigid unitary member formed entirely from an animal digestible material (e.g., dog food), for example, by extrusion. In other embodiments, treat rod 102 may be made partially of animal digestible material (e.g., dog food) and partially of a non-digestible material, such as rawhide. In yet other embodiments, treat rod 102 may be made completely of a non-digestible material, such as rawhide or a resilient elastomer. In any case, treat rod 102 may optionally be further impregnated with a scent or other attractant in order to further incentivize an animal to interact with treat rod 102.

In various embodiments, treat rod 102 includes an exterior surface 106 and an interior surface 104 that defines an interior cavity extending the length of treat rod 102. Interior surface 104 includes a plurality of projections 108 extending from interior surface 104 into the cavity. Projections 108 preferably run the length of the interior cavity. In one or more embodiments, a plurality of digestible animal treats 110 (which may also be formed by extrusion and/or may also be impregnated with a scent or other attractant) are retained within the cavity of treat rod 102 by projections 108. Although in the depicted embodiment, treat rod 102 includes four projections, in other embodiments a lesser or greater number of projections 108 can be implemented. In various embodiments, exterior surface 106 can further include a plurality of grooves 112 extending along the length of (and/or circumferentially about) treat rod 102. Grooves 112 decrease the wall thickness of treat rod 102, allowing it to be fractured along grooves 112 into smaller pieces that can be more easily chewed and/or consumed by a pet (and/or With reference to FIG. 2, a chain of animal digestible treats 110 is illustrated as being positioned within the cavity of treat rod 102. Specifically, a animal digestible treat 110A is positioned to block the cavity at one end of treat rod 102, and a animal digestible treat 110B is positioned to block the cavity at an opposite end of treat rod 102 to retain one or more intermediate animal digestible treats 110C within treat rod 102. In various embodiments, projections 108 are configured to permit animal digestible treats 110C to be easily slidably received in the cavity of treat rod 102 when inserted in a first orientation and animal digestible treats 110A and 110B (of the same dimensions as animal digestible treats 110C) to block ends of the cavity of treat rod 102 by interference fit with projections 108 when inserted in a second orientation. In at least some embodiments, projections 108 are sized to define different interior clearances orthogonal to the long axis of treat rod 102 in order to provide tolerance for animal digestible treats 110 of differing lengths to be side-loaded into treat rod 102 in the second orientation and held by interference fit with projections 108. Thus, in the depicted embodiment, animal digestible treats 110 having a lesser overall length may be held between a first pair of opposing projections 108, and animal digestible treats 110 having a greater overall length may be held between a second pair of opposing projections 108. It should be appreciated that one or more additional animal digestible treats 110 intermediate animal digestible treats 110A and 110B may also be inserted into the cavity in the second orientation to increase the challenge to an animal in emptying animal digestible treats 110 from treat rod 102.

In use, treat rod 102 may be loaded with one or animal digestible treats 100 in either the first orientation or the second orientation and then provided to an animal to interact with. The animal, such as a dog, will then lick, bite and/or chew treat rod 102 to fragment and/or consume treat rod 102 and/or dislodge one or more of animal digestible treats 100A, 110B. In fragmenting treat rod 102 and/or dislodging animal digestible treats 110A or 110B, the animal will also gain access to and be able to consume the animal digestible treats 110C loaded therein.

Figure 3:
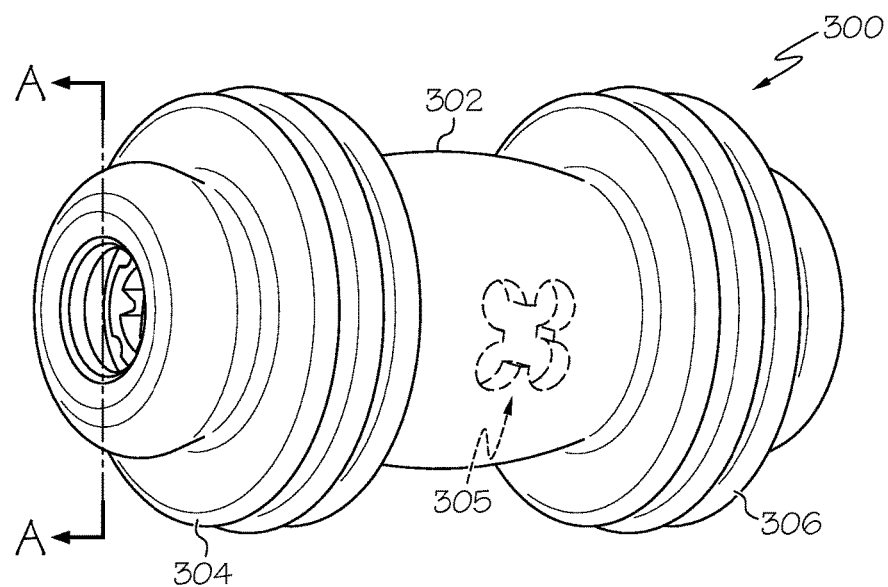
FIG. 3 is a perspective view of a pet toy (in a barbell configuration) that functions as an animal treat delivery system in accordance with one embodiment.
Figure 4:
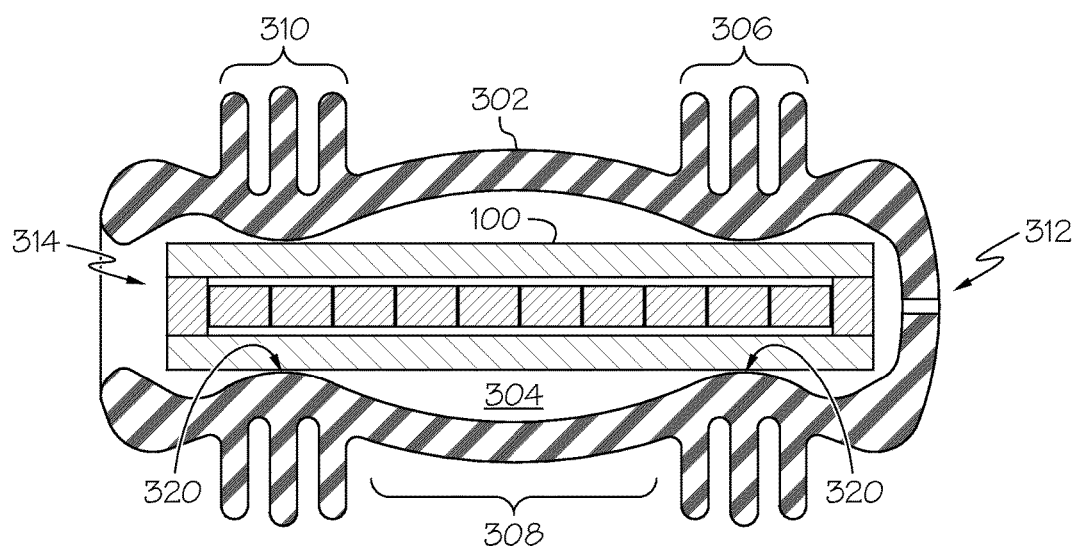
FIG. 4 is a section view (along the line A-A) of the pet toy of FIG. 3.

With reference to FIGS. 3 and 4, an animal treat delivery system 300 is illustrated that is configured according to one aspect of the present disclosure. Animal treat delivery system 300 includes a resilient elastomeric body (pet toy) 302 having an interior cavity 304. Pet toy 302 may be formed, for example, of a thermoplastic elastomer by injection molding. As indicated in FIG. 4, an animal treat delivery system 100 (which includes treat rod 102 and animal digestible treats 110) may be positioned completely within interior cavity 304 of pet toy 302. Providing animal treat delivery system 100 to an animal disposed completely within interior cavity 304 of pet toy 302 as shown tends to increase the time interval required by a pet to fragment and/or consumer treat rod 102 and to empty animal digestible treats 110 from pet toy 302. Animal treat delivery system 100 is preferably retained within cavity 304 of pet toy 302 by interference fit with one or more features within interior cavity 304. For example, in the depicted embodiment, animal treat delivery system 100 is retained within interior cavity 304 by two circumferential ridges 320, best seen in the second view along line A-A given in FIG. 4.

In the embodiment of FIG. 4, pet toy 302 includes an opening 314 in a first end that communicates between interior cavity 304 and an exterior of pet toy 302 to permit animal treat delivery system 100 to be inserted into (and, if desired, removed from) interior cavity 304. Pet toy 302 preferably further includes an opening 312 (formed in a second end that is opposite the first end) that communicates between interior cavity 304 and an exterior of pet toy 302. In the depicted embodiment, opening 312 is sized smaller than animal digestible treats 110 and serves only as a pressure relief to eliminate a suction condition that might occur in absence of an additional opening. It should be appreciated that in other embodiments, both of openings 312 and 314 may be sized to permit treat rod 102 to be inserted into interior cavity 304.

As is illustrated in FIG. 4, an exterior surface of pet toy 302 includes a first group of integral projections (fins) 306 adjacent a first end of pet toy 302 and a second group of integral projections (fins) 310 adjacent a second end of pet toy 302. In one embodiment, each of the group of projections includes three projections. It should be appreciated that a group of ridges of a pet toy configured according to the present disclosure may include more or less than three projections. In addition to providing ornamental utility, projections 306, 310 can desirably cause pet toy 302 to bounce erratically when thrown and can increase the effort and time required for a pet to fracture one or more portions of a treat rod 102 disposed in interior cavity 304.

Pet toy 302 may also optionally include at least one aperture 305 in central portion 308 that extends from an exterior of pet toy 302 to interior cavity 304. Aperture 305 provides an additional opening through which an animal can sense the contents of pet toy 302 and through which animal digestible treats 110 and/or fragments of treat rod 102 can exit interior cavity 304.

Figure 5:
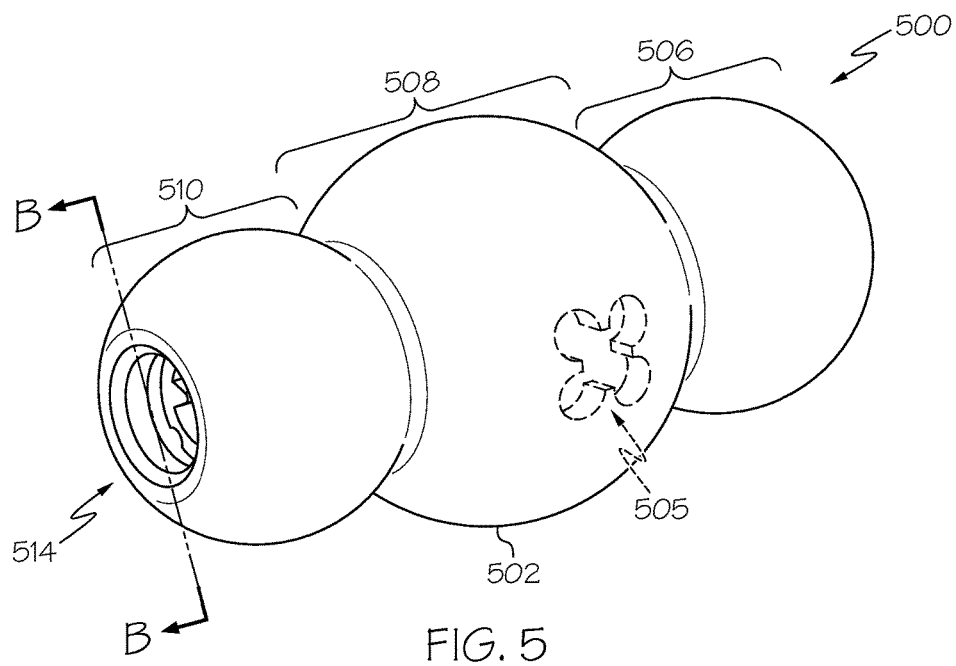
FIG. 5 is a perspective view of a pet toy (in a multi-ball configuration) that functions as an animal treat delivery system in accordance with another embodiment.
Figure 6:
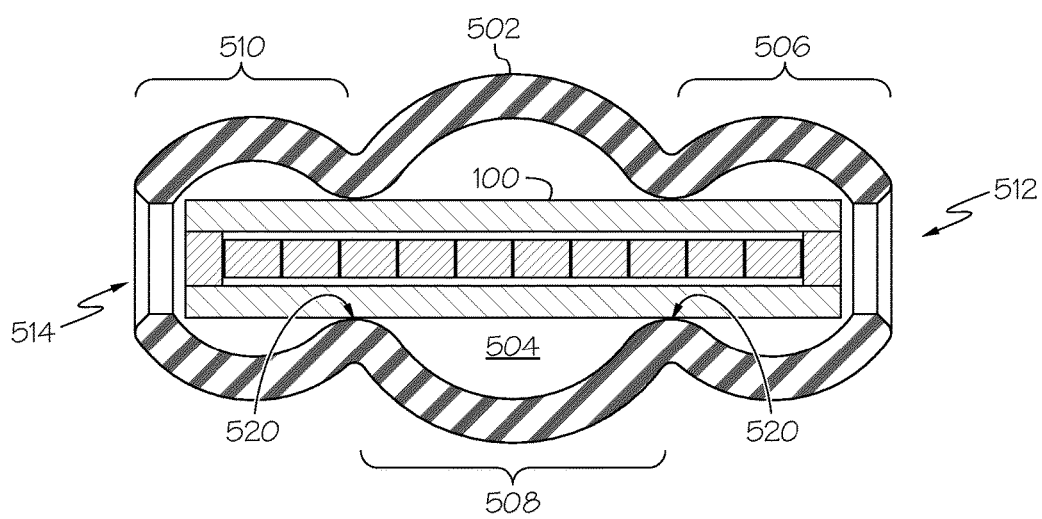
FIG. 6 is a section view (along the line B-B) of the pet toy of FIG. 5.

With reference to FIGS. 5 and 6, an animal treat delivery system 500 is illustrated that is configured according to one aspect of the present disclosure. Animal treat delivery system 500 includes a resilient elastomeric body (pet toy) 502 having an interior cavity 504. As described above with reference to pet toy 302, pet toy 502 may be formed, for example, of a thermoplastic elastomer by injection molding. As indicated in FIG. 6, an animal treat delivery system 100 (which includes treat rod 102 and animal digestible treats 110) may be positioned completely within interior cavity 504 of pet toy 502. Animal treat delivery system 500 includes animal treat delivery system 100 (which includes treat rod 102 and animal digestible treats 110) completely positioned within an interior cavity 504 of elastomeric body (pet toy) 502. Animal treat delivery system 100 is preferably retained within cavity 504 of pet toy 502 by interference fit with one or more features within interior cavity 504. For example, in the depicted embodiment, animal treat delivery system 100 is retained within interior cavity 504 by two circumferential ridges 520, best seen in the second view along line B-B given in FIG. 6.

In the embodiment of FIG. 6, pet toy 502 includes an opening 514 in a first end that communicates between interior cavity 504 and an exterior of pet toy 302 to permit animal treat delivery system 100 to be inserted into (and, if desired, removed from) interior cavity 504. Pet toy 502 preferably further includes an opening 512 (formed in a second end that is opposite the first end) that communicates between interior cavity 504 and an exterior of pet toy 502. In the depicted embodiment, opening 512 is sized to permit treat rod 102 to be inserted there through into cavity 504. Opening 514 also serves as a pressure relief to eliminate a suction condition that might occur in absence of an additional opening and can also be sized to permit extraction from interior cavity 504 of a core utilized to mold pet toy 502.

As is illustrated in FIG. 6, an exterior surface of pet toy 502 has the general appearance of three interconnected balls 506, 508, and 510. While three balls are illustrated in FIGS. 5-6, it should be appreciated that more or less than three balls may be employed in a pet toy configured according to the present disclosure. Pet toy 502 may also optionally include one or more apertures 505 within one or more of balls 506, 508 and 510 to permit animal digestible treats 110 and/or fragments of treat rod 102 to exit from interior cavity 504 to an exterior of pet toy 502.

In use, a pet toy 302 or 502 may be loaded with a treat rod 102, which in turn can optionally be loaded with one or animal digestible treats 100 as previously described. The pet toy 302 or 502 can be provided to an animal to interact with. The animal, such as a dog, will then bite and/or chew the pet toy 302 or 502 to fragment the treat rod 102 installed therein and cause fragments of the treat rod 102 and/or animal digestible treats 110 to exit the pet toy 302, 502. The animal can then consume the fragments of the treat rod 102 and/or animal digestible treats 110.

While the present invention has been particularly shown as described with reference to one or more preferred embodiments, it will be understood by those skilled in the art that various changes in form and detail may be made therein without departing from the spirit and scope of the invention. For example, although the present invention has been described with reference to a particular embodiment in which article is a pet toy, the present invention as described may also be embodied in other useful articles, such as containers, treat and food dispensers, and balls.

What is claimed is:

1. An animal treat delivery system, comprising:
   an elongated body formed of an animal digestible material, said elongated body having an exterior surface and an interior surface defining an interior cavity extending along a longest dimension of the elongated body and terminating at an opening, wherein the interior surface includes a plurality of projections extending along the longest dimension of the elongated body and projecting from the interior surface into the interior cavity and terminating at free ends spaced apart from one another by at least at least an interior dimension; and
   a plurality of discrete animal digestible treats disposed within the interior cavity of the elongated body, wherein:
      the plurality of discrete animal digestible treats all have a first dimension less than the interior dimension;
      one or more first treats among the plurality of discrete animal digestible treats are installed within the interior cavity in a first orientation such that the first treats easily slide along the interior cavity between the free ends of the plurality of projections; and
      one or more second treats among of the plurality of discrete animal digestible treats have a second dimension fitting with interference fit in the interior dimension, and wherein the second treats are wedged between the free ends of the plurality of projections in a second orientation different from the first orientation, such that the one or more second treats temporarily retain the one or more first treats within the interior cavity and temporarily prevent the one or more first treats from sliding out the opening.

2. The system of claim 1, further comprising:
   an elastomeric body having an interior cavity and at least one opening communicating between the interior cavity of the elastomeric body and an exterior of the elastomeric body, wherein the elongated body is disposed in the interior cavity of the elastomeric body.

3. The system of claim 2, wherein:
   the elastomeric body has a first end and an opposing second end; and
   the at least one opening includes a first opening in the first end of the elastomeric body.

4. The system of claim 3, wherein the at least one opening includes a second opening, and wherein the second opening is formed in the second end.

5. The system of claim 2, wherein the elastomeric body includes an exterior surface having a series of ridges extending therefrom.

6. The system of claim 2, wherein the elastomeric body includes at least one centrally located aperture that extends from the exterior to the interior cavity of the elastomeric body.

7. The system of claim 1, wherein each of the plurality of projections runs the entire length of the interior cavity of the elongated body.

8. The system of claim 1, wherein the plurality of projections includes only four projections.

9. The system of claim 1, wherein the exterior surface of the elongated body has a plurality of grooves formed therein at which a thickness of the elongated body between the interior surface and exterior surface is relatively less than at other locations on the elongated body.

10. A method of making an animal treat delivery system, comprising:
    extruding from an animal digestible material an elongated body having an exterior surface and an interior surface defining an interior cavity extending along a longest dimension of the elongated body and terminating at an opening, wherein the interior surface includes a plurality of projections extending along the longest dimension of the elongated body and projecting from the interior surface into the interior cavity and terminating at free ends spaced apart from one another by at least at least an interior dimension; and
    forming a plurality of discrete animal digestible treats all having a first dimension less than the interior dimension, such that one or more first treats among the plurality of discrete animal digestible treats disposed in a first orientation easily slide along the interior cavity between the free ends of the plurality of projections, and such that one or more second treats among the plurality of discrete animal digestible treats have a second dimension sized for interference fit between the free ends of the plurality of projections to temporarily prevent the one or more first treats from sliding out the opening.

11. The method of claim 10, further comprising:
  forming an elastomeric body having an interior cavity and at least one opening communicating between the interior cavity and an exterior of the elastomeric body, wherein the interior cavity of the elastomeric body is configured to receive and retain the elongated body.

\* \* \* \* \*